UNITED STATES PATENT OFFICE.

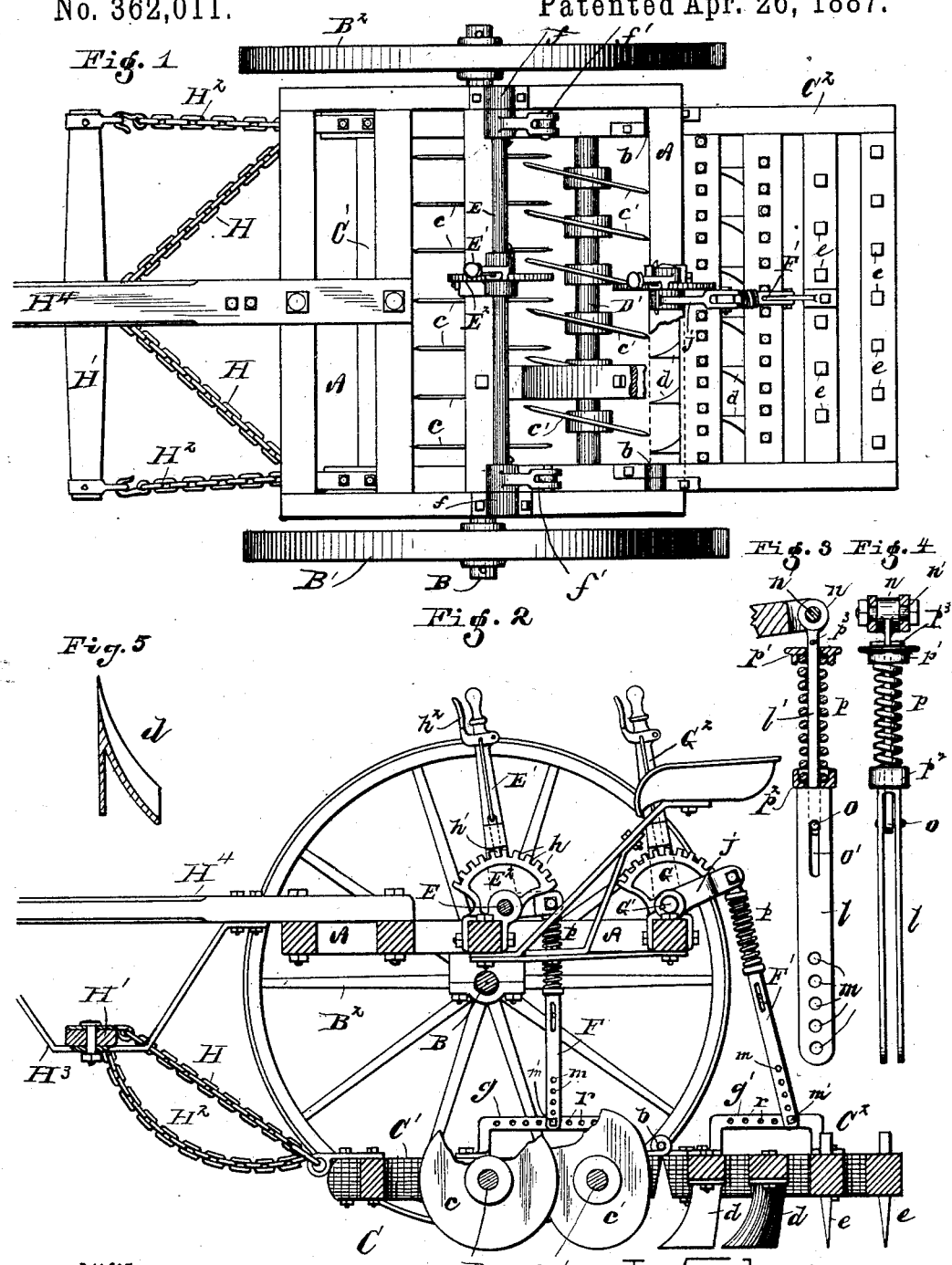

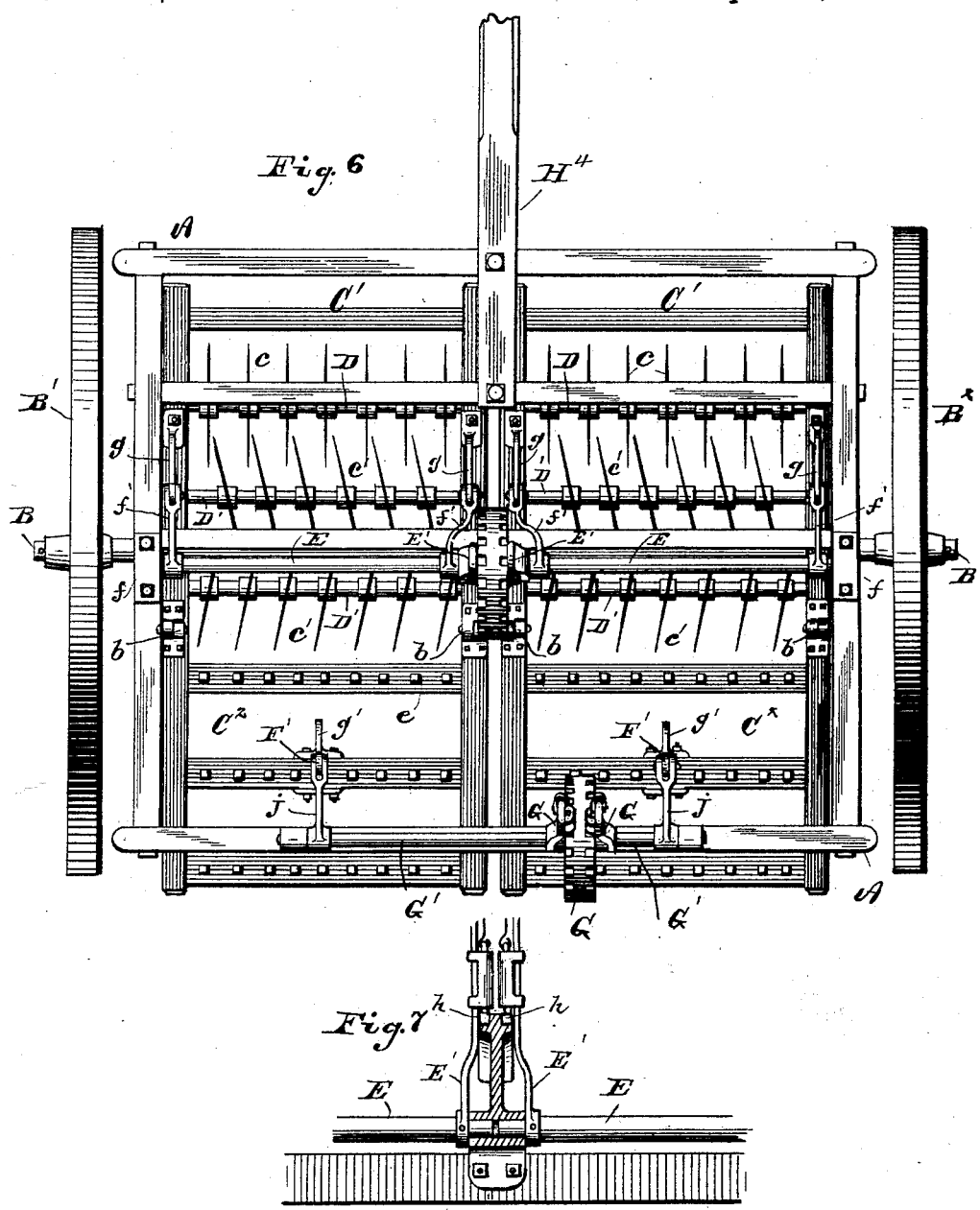

JOHN S. JUDSON, OF SPRINGFIELD, AND JOSEPH CAMERON, OF CYNTHIANA, OHIO, ASSIGNORS TO THE CAMERON HARROW AND WAGON COMPANY, OF CHICAGO, ILLINOIS.

HARROW.

SPECIFICATION forming part of Letters Patent No. 362,011, dated April 26, 1887.

Application filed September 25, 1886. Serial No. 214,561. (No model.)

*To all whom it may concern:*

Be it known that we, JOHN S. JUDSON, of Springfield, Clark county, Ohio, and JOSEPH CAMERON, of Cynthiana, Pike county, Ohio, both citizens of the United States, have invented certain new and useful Improvements in Harrows, of which the following is a specification.

Our invention relates to the class of harrows in which the harrow proper is supported by carrying-wheels and means provided for raising and lowering the harrow in relation to said carrying-wheels; and it particularly relates to those harrows in which a series of cutting-disks are used in connection with harrow-teeth, as set forth in the Patent No. 274,267, issued March 20, 1883, to Joseph Cameron, for improvement in harrows.

Our invention consists in a novel arrangement of the raising and lowering devices, in connection with the harrow and supporting-frame.

It further consists in hinging the harrow between the disks and teeth, thus dividing the harrow in two sections, and providing independent means for raising and lowering the respective sections.

It further consists in various constructions and combinations, hereinafter described and claimed.

In the accompanying drawings, in which like parts are indicated by similar letters of reference throughout the several views, Figure 1 is a plan view of a harrow embodying our invention. Fig. 2 is a transverse sectional view of the same. Figs. 3 to 5 are detailed views, referred to hereinafter. Fig. 6 is a modified form of the invention, and Fig. 7 is a detailed view of parts of the same.

In said drawings, A represents the main supporting-frame provided with suitable bearings, $a\ a$, on either end thereof, for the main axle B, on which is secured, at either end, carrying-wheels B' and B².

C is the frame of the harrow proper, which is composed of two sections, C' and C², hinged at $b\ b$ on a line parallel with the main axle B.

Journaled in the front section, C', of the harrow-frame are shafts D and D', each of which is provided with a series of cutting-disks, $c\ c'$.

The cutting-disks on one shaft are arranged at right angles thereto and parallel to the line of draft. The disks of the other series are arranged at oblique angles to their shaft, and also at an angle to the line of draft, substantially as set forth in Cameron's patent, mentioned above.

In the rear section, C², of the harrow-frame we provide two rows of shovels, $d$, each of which is formed with one straight side and one angular side, as shown in cross-section, Fig. 5, the shovels in one row being adapted to come opposite the spaces between the shovels in the other row, the angular side of the shovels in the respective rows being faced in opposite directions, as shown in Fig. 1. Immediately behind the shovels $d$ we provide two rows of harrow-teeth, $e$, arranged in the ordinary manner.

Extending across the supporting-frame A, parallel with the main axle B, and journaled at either end in suitable bearings, $f\ f$, is a shaft, E, provided near said bearings with crank-arms $f'\ f'$. Extending downward from each of the crank-arms $f'\ f'$ to the front section, C', of the harrow-frame is a connecting-link, F. These connecting-links are each pivotally connected at the upper end to the respective crank-arms $f'\ f'$ and at the lower end to a yoke, $g$, secured to the section C' of the harrow-frame. At or near the center of the shaft E is a hand-lever, E', rigidly secured to said shaft and adapted to turn therewith.

Secured to the frame A, near the hand-lever E', and preferably provided with a bearing for said shaft, is a ratchet-stand, E², provided with a series of notches, $h$, with which a spring-bolt, $h'$, is adapted to engage, a suitable thumb-latch, $h²$, being provided to withdraw said spring-bolt when desired. It will be seen, now, that as the hand-lever is moved backward or forward the crank-arms $f'\ f'$ will be turned in the arc of a circle to different angular positions, and, through the medium of the connecting-links F, will correspondingly raise or lower the front section, C', of the harrow-frame, thus raising or lowering the cutting-disks $c\ c'$.

Secured to the supporting-frame A, at the rear and near the middle thereof, is a second ratchet-stand, G, provided with a bearing for a short shaft, G', to which is rigidly secured at one end a hand-lever, G², and at the other end a crank-arm, j. Extending from the crank-arm j to a yoke, g', on the rear section, C², of the harrow-frame is a connecting-link, F', adapted, as the hand-lever G² is moved backward or forward, to raise or lower the said rear section, C².

The front section, C', of the harrow is connected by suitable draft-chains to the doubletree H', suitable stay-chains, H², being also provided.

In order that the draft from the horses may be applied to the harrow as nearly horizontal as possible, we provide a supporting-frame, H³, for the double-tree H', which supporting-frame depends from the tongue H⁴ to a point midway between the said tongue and the harrow-frame.

As the harrow is drawn forward, the harrow having been lowered by means of the hand-lever E' and G², the straight disks c and the angular disks c' will be revolved, thus cutting and stirring the soil. The shovels d throw the soil from side to side, after which come the harrow-teeth, breaking any clods which may remain.

The rear section, containing the shovels and teeth, being hinged to the front section, the harrow is capable of adapting itself more readily to any unevenness of the ground. The rear section, C', being also independently connected to the supporting-frame by the connecting-links F' and hand-lever G², may be raised and lowered independently, thus raising the shovels and teeth without disturbing the disks c and c'. By this arrangement the shovels and teeth may be raised entirely clear of the ground, leaving the disks alone in operation; or the respective sections may be so adjusted in relation to each other that either the disks or the teeth shall be forced into the ground to a greater depth than the other, or both may be forced into the soil to an equal depth, as desired.

In order that the different parts of the harrow may more readily adjust themselves to inequalities of the ground and thus pulverize the soil entirely throughout, we provide a yielding connection between the respective sections and the lifting-levers, adapted to permit a limited yielding movement of the harrow-sections in relation to each other and independent of the lifting-levers. This we preferably accomplish as follows: The connecting-links F and F' we make in two parts, l and l'. The lower part, l, is made in the form of a loop, the sides of which, at the lower end, are each provided with a series of holes, m, through which the pins m', which connect the links to the yokes g', are adapted to pass. The upper part, l', of each link consists of a plain connecting-bar having at the upper end an eye, n, through which is adapted to pass a pin, n', to connect the links to the respective bifurcated crank-arms f' and f'. The lower end of the connecting-bar l' is adapted to pass through an opening in the top of the loop l, and is secured therein by a small cross-pin, o, which passes transversely through the bar l', and is supported at either end in slotted openings o' in either side of said loop. The bar l' is adapted to slide longitudinally through the opening in the top of the loop l, being guided and limited in its movement by the cross-pin o and slotted openings o'. Extending from the top of the loop l to a point on the bar l', near the eye n, is a coiled spring, p, adapted to be compressed as the bar l' is moved longitudinally in relation to the yoke l, and to return said bar to its normal position when the pressure thereon is removed. The spring p is preferably provided at either end with spring-caps p' p², the upper of which rests against a pin or projection, p³, on the bar l'.

It will be seen that by the above-described arrangement any desired pressure may be exerted on the harrow-sections by means of the hand-levers E' and G'. The connecting-links being each composed of two parts, with an elastic connection between them, a yielding pressure will be applied to the said sections, which will permit the said sections to readily adjust themselves to any inequalities of the ground.

The springs are made of sufficient tension to sustain the weight of the frame and driver, so that the entire weight may be applied to the harrow, thus obviating the necessity of putting extra weights on the harrow proper.

In Fig. 6 we have shown a modified form of our device. In this form two separate harrows are used, supported by a single frame, each of said harrows being hinged between the teeth and disks and provided with independent raising devices for the different sections. The shaft E is made in two parts, the inner ends of each part being journaled in a suitable bearing in a double ratchet-stand, with which the respective levers E', attached to the parts of said shaft, are adapted to engage. The rear lifting-levers, G', are each secured on the end of a short shaft, which extends from the middle of the supporting-frame to a point above the center of its harrow-section, a double ratchet-stand being also provided to support the inner ends of said shafts and hold their respective levers in different positions of adjustment. In this modified form of the device we have shown three rows of disks in the front sections and three rows of teeth in the rear sections, the shovels being dispensed with.

The yokes g g' on the respective sections to which the connecting-links are attached are each provided with a series of holes, r, which, with the holes m in the said links, furnish the means for adjusting the pressure from the hand-levers to the respective sections, so that the pressure may be applied centrally or otherwise to said sections and the tension of the springs increased or decreased, as desired.

Having thus described our invention, we claim—

1. The combination, with the supporting-frame, of the harrow consisting of disks and teeth, as described, said disks and teeth being arranged in different sections of the harrow-frame, which are hinged together, and means for independently raising or lowering the respective sections in relation to the supporting-frame, substantially as set forth.

2. The combination, with the supporting-frame and the harrow depending therefrom, of the harrow-frame composed of two sections hinged together, and provided on one section with a series of cutting-disks and on the other with a series of stationary teeth or projections, lifting-levers on the supporting-frame, connecting-links from each section to the respective lifting-levers, and means for holding said levers in different positions of adjustment, whereby the sections may be forced downward independently, substantially as specified.

3. The combination of the supporting-frame and the harrow, in two sections, depending therefrom, one of said sections being provided with a series of disks and the other section being provided with a series of teeth, independent lifting-levers for each of said sections, and an elastic or yielding connection from each of said sections to the respective levers, adapted by a movement of said levers to exert a yielding pressure on the respective sections, substantially as set forth.

4. The combination of the supporting-frame and the harrow depending therefrom, said harrow being made in two sections hinged together, one section being provided with straight and angular disks in series and the other section being provided with a series of shovels and teeth, substantially as specified.

5. The combination, with the supporting-frame and the depending harrow made in sections, of the lifting-levers and the connecting-links from said levers to the harrow-sections, said links being composed of a loop provided with longitudinal slots in the sides thereof, a sliding bar provided with a cross-pin adapted to reciprocate in said slots, and a spring around said bar, adapted to be compressed by a longitudinal movement of said bar in relation to said loop, substantially as set forth.

6. The combination, with the supporting-frame and the depending harrow, said harrow being made in sections provided, respectively, with revolving disks and stationary teeth, of the lifting-levers on said frame, connecting-links extending from said lifting-levers to the harrow, and yokes on the harrow provided with a series of holes, to which the links are adapted to be connected, substantially as specified.

7. The combination, with the supporting-frame and the depending harrow, said harrow being made in sections, one of which is provided with straight and angular revolving disks and the other with stationary teeth, of the lifting-levers on said frame, connecting-links extending from said lifting-levers to the harrow, and means for adjusting said links vertically and laterally in relation to said harrow, substantially as described.

8. The combination, with the supporting-frame and the depending harrow-sections, of the oscillating shaft extending across said supporting-frame, a hand-lever secured to said shaft, crank-arms at either end thereof, and an elastic connection from said crank-arms to the said harrow-sections, substantially as and for the purpose set forth.

9. The combination, with the supporting-frame having the lifting-levers, and the crank-arms secured to and adapted to move with said levers, of the harrow under said frame, made in sections and hinged together, as described, independent elastic connecting-links from each of said sections to the respective lifting-levers, and means for adjusting said links vertically and laterally to the harrow-sections, substantially as set forth.

10. The combination, with the supporting-frame, of two or more independent harrows depending therefrom, each of said harrows being composed of two sections hinged together on a line at right angles to the line of draft, lifting-levers on the supporting-frame, and independent elastic connections from each of said harrow-sections to the said lifting-levers, substantially as described.

11. The combination, with a single supporting-frame, of the double harrow composed of independent harrows depending from said supporting-frame, hinged sections in each of said harrows, provided, respectively, with cutting-disks and stationary projections, and means for independently raising or lowering each of said harrow-sections, substantially as specified.

In testimony whereof we have hereunto set our hands this 27th day of July, A. D. 1886.

JOHN S. JUDSON.
JOSEPH CAMERON.

Witnesses to signature of John S. Judson:
    PAUL A. STALEY,
    P. J. CLEVENGER.
Witnesses to signature of Joseph Cameron:
    ETTIE C. KILE,
    H. C. CLAYPOOL.